Oct. 3, 1961 J. R. KUKSA 3,003,033
ADAPTER CIRCUIT FOR ADDING AUTOMATIC ANSWERING TO CENTRAL STATION SWITCHING EQUIPMENT
Filed Nov. 3, 1958
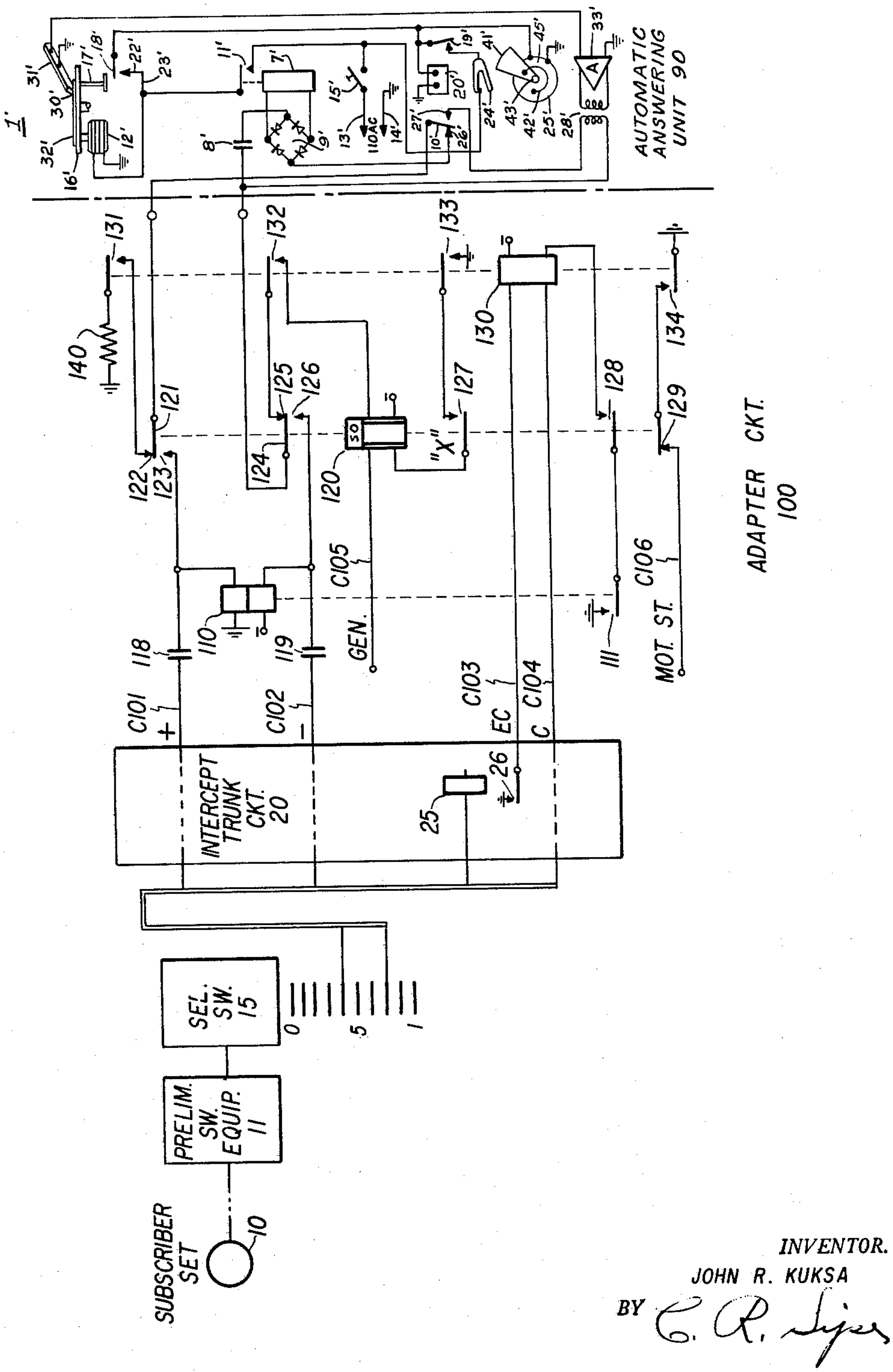
INVENTOR.
JOHN R. KUKSA
BY C. R. Sipes
ATTY.

3,003,033

ADAPTER CIRCUIT FOR ADDING AUTOMATIC ANSWERING TO CENTRAL STATION SWITCHING EQUIPMENT

John R. Kuksa, Chicago, Ill., assignor to Automatic Electric Laboratories, Inc., a corporation of Delaware Filed Nov. 3, 1958, Ser. No. 771,490
2 Claims. (Cl. 179—6)

This invention relates to intercept circuits for telephone systems and more particularly to those utilizing automatic answering devices.

It is an object of the invention to provide a circuit which allows a standard automatic answering device responsive to ringing current to be used to intercept calls made through dead selector levels.

It is a further object of the present invention to provide a simple circuit which can be reached from unused selector levels and which performs the usual connector functions of providing ringing, ring cut-off and "on-off hook" supervision by a battery feed relay.

Another object of the invention relates to an intercept adapter circuit having a relay which performs a multiple function including providing a time-interval prior to its operation, and which upon operating cuts off the circuit ringing current, switches the line conductors through and thereby connects a battery feed relay for providing release supervision by the answering device.

The drawing shows an embodiment of applicant's invention.

In brief, the present invention allows the utilization of a telephone answering device, such as that shown in U.S. Patent 2,769,859, issued November 6, 1956, to J. J. Zimmermann, to provide an intercept message from dead selector levels. The answering device, the relevant portions of which are shown schematically on the right hand side of the drawing and which is referenced with the same numerals, only primed, as in the U.S. Patent 2,769,859, referred to is initiated by a splash of ringing tone, usually 90 volts A.C., and responds by closing a D.C. loop over the called line after the receipt of a predetermined number of splashes of ringing current, then playing back the recorded message and finally reopening the loop automatically—all as disclosed in the Zimmermann patent. This type of answering unit is generally used on specific subscribers' lines where it may respond to the ringing current sent to the called subscriber's telephone. To utilize this type of answering device from a selector level requires the provision of ringing current to initiate the operative cycle of the answering unit. The ringing must be cut off when the unit has responded; there must be provided a transmission current source during the operating cycle of the answering unit, and the unit must be released when the calling party restores his handset. These are the functions which normally are performed by a connector when individual answering service is provided.

In the drawing, is shown a subscriber set 10 for initiating calls to the system. When the subscriber set 10 is to be used to initiate a call, the handset is lifted and in a generally known manner, line equipment is connected to the calling line and any preliminary digits are dialled. The equipment for these steps, including line equipment and the required number of ranks of selectors is shown representatively as preliminary switching equipment 11. Germane to the subject of this invention, the selector 15 is seized by the preliminary equipment. Selector 15 may be in any rank of selectors and is of any generally known type of switch intermediate in a switch train and thus not posessing the features required normally by the final switch in the switch train. In the preferred embodiment shown, selector 15 is of the known Strowger or two-motion type.

It will be assumed that various of the levels of selector 15 contain connections to other selectors or connectors and that, for example, the third level has no such connections. Thus any calls which are dialled to gain access to the third level must be intercepted and notice returned to the caller that the level dialled is a dead one. This notice may given verbally by an operator or by the use of a recorded message. It is to the recorded message type that this invention, of course, relates.

When the third level of selector 15 has been dialled, the selector seizes intercept trunk 20 and switches through in a known manner. Intercept trunk 20 is generally of the type shown in U.S. Patent 2,579,722, issued to H. W. Balzer, on December 25, 1951. This trunk circuit is designed for use with a mechanical answering unit controlled by the application of a complete line loop for initiation.

The operation of the present invention is as follows: In the intercept trunk 20 after seizure, relay 25 is operated closing its contacts 26. These contacts send forth a ground on the CW lead to lead C103. This ground is fed through the upper winding of relay 130 to battery. Relay 130 then operates. At contacts 131 and 132, a ringing generator current is closed from lead C105, through the upper winding of slow-to-operate relay 120, contacts 132, 124, and 125, capacitor 8', through the diode bridge 9', the start relay 7' of answering unit 90, through the diode bridge 9', contacts 26', 121, 122, 131 and resistor 140 to ground. This ringing current causes the answering unit to respond. After a time period, that is, after relay 20' has operated upon the receipt by unit 90 of a number of splashes of ringing current, slow-to-operate relay 120 will operate over the mentioned circuit. At contacts 127, relay 120 locks itself from ground through contacts 133 and 127 to battery. At contact pairs 124—125 and 121—122, the ringing generator circuit is opened. At contact pairs 125—126 and 122—123, the two conductors from the answering unit 90 are switched through to the switch train and calling station. Thus the circuit is completed from (+) lead C101, through capacitor 118, contact pair 121—123 to the answering unit 90 (+) lead, and out the unit (−) lead, through contact pair 124—126, capacitor 119 to (−) lead C102. This switching-through also completes a circuit to transmission relay 110 which then is bridged across the line. This relay performs the function of providing on-off hook supervision under the control of relay 20' of the answering device. Relay 110 operates and closes contacts 111. Relay 130 is thereby locked over the C lead C104 and contacts 128 and 111 to ground. This ground at contacts 111 also serves to busy the intercept and adapter circuits to further seizure.

The answering unit 90 once started transmits the recorded message to the calling station, who, after hearing the message will release the switch train. In the intercept circuit, ground has been removed from the lead to C103 at some time after relay 110 has operated. When the switch train is released battery is removed from the C lead C104 in a known manner. Relay 130 then releases opening all of its contacts. Relays 110 and 120 restore and the intercept unit is thereby released. Both the adapter and the answering device are then in readiness to intercept further calls to dead levels. If the calling station after hearing the messags fails to release the switch train, the loop is automatically opened in the answering unit due to the release of relay 20' under the control of timer switch 24'. Relay 110 is released and hence ground is removed from the C lead C104 at contact 111. Relay 130 then releases opening all its contacts. Relay 120 restores and the intercept unit is thereby released. Both the adapter and the answering device are then in readiness to intercept further calls to dead levels.

What is claimed is:

1. In an automatic telephone system, a selector having a plurality of selector levels, at least one of which is unassigned, intercept means connected to the unassigned ones of the selector levels comprising: an intercept trunk circuit operated in response to the extension of a connection from a calling line to one of said unassigned selector levels; an automatic answering unit including an input circuit, reproducing means for transmitting a prerecorded message, and start means operated only in response to ringing current impressed on said input circuit for initiating the operation of said reproducing means to transmit said prerecorded message; a ringing circuit including a ringing current generator having an output circuit and a slow-to-operate relay having its operate coil connected in series with said generator output circuit; relay means connected to said intercept trunk circuit operated in response to the operation thereof to connect said ringing circuit to said input circuit of said automatic answering unit; an extension circuit including a first and a second conductor connected to said intercept trunk circuit for extending the connection from said calling line beyond said intercept trunk circuit; contact means operated in response to the operation of said slow-to-operate relay over said ringing circuit to disconnect said ringing circuit from said input circuit of said automatic answering unit and to connect said conductors of said extension circuit thereto; and a supervisory relay operated over said input circuit of said automatic answering unit for controlling the subsequent operation of said intercept unit in response to supervisory signals returned by said automatic answering unit.

2. In an automatic telephone system, a selector having a plurality of selector levels, at least one of which is unassigned, intercept means connected to the unassigned ones of said selector levels comprising: an intercept trunk circuit operated in response to the extension of a connection from a calling line to one of said unassigned selector levels; an automatic answering unit including an input circuit, reproducing means for transmitting a prerecorded message, and start means operated only in response to ringing current impressed on said input circuit for initiating the operation of said reproducing means to transmit said prerecorded message; a ringing circuit including a ringing current generator having an output circuit and a slow-to-operate relay having its operate coil connected in series with said generator output circuit; relay means connected to said intercept trunk circuit operated in response to the operation thereof to connect said ringing circuit to said input circuit of said automatic answering unit; an extension circuit including a first and a second conductor connected to said intercept trunk circuit for extending the connection from said calling line beyond said intercept trunk circuit; contact means operated in response to the operation of said slow-to operate relay over said ringing circuit to disconnect said ringing circuit from said input circuit of said automatic answering unit and to connect said conductors of said extension circuit thereto; a source of direct current bridged across the conductors of said extension circuit to supply transmission battery to said automatic answering unit; a supervisory relay serially connected between said direct current source and said input circuit of said automatic answering unit operated in response to the operation of said automatic answering unit and under the control thereof thereafter; two capacitors, one included in each of said conductors of said extension circuit to prevent operation of said supervisory relay in response to the extension of said connection from said calling line; and a supervisory circuit controlled by the operation of said supervisory relay to maintain an operating circuit for said automatic answering unit, whereby the subsequent operation of said intercept unit is controlled by said automatic answering unit.

References Cited in the file of this patent

UNITED STATES PATENTS

| | | |
|---|---|---|
| 2,385,968 | Deakin | Oct. 2, 1945 |
| 2,824,907 | Peterson | Feb. 25, 1958 |
| 2,846,505 | Keith | Aug. 5, 1958 |